US 6,718,746 B2

(12) United States Patent
Hettiger et al.

(10) Patent No.: US 6,718,746 B2
(45) Date of Patent: Apr. 13, 2004

(54) DRIVE ARRANGEMENT FOR ENSILAGE HARVESTER DISCHARGE SPOUT

(75) Inventors: Marcus Hettiger, Rehlingen-Siersburg (DE); Peter Lipiceanu, Zweibrücken (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/216,015

(22) Filed: Aug. 9, 2002

(65) Prior Publication Data

US 2003/0037527 A1 Feb. 27, 2003

(30) Foreign Application Priority Data

Aug. 25, 2001 (DE) .......................... 101 41 702

(51) Int. Cl.[7] .......................... A01D 69/08; A01F 12/46
(52) U.S. Cl. .................. 56/11.7; 56/DIG. 6; 37/261; 460/114
(58) Field of Search .................. 56/10.5, 11.7, 56/12.8, 13.3, 16.4 R, 16.6, DIG. 6; 460/114, 119; 192/56.6; 464/47; 37/244, 246, 237, 261

(56) References Cited

U.S. PATENT DOCUMENTS

| 4,417,650 A | | 11/1983 | Geisthoff | |
|---|---|---|---|---|
| 4,617,003 A | * | 10/1986 | Bober et al. | 464/48 |
| 4,706,801 A | * | 11/1987 | Vessey | 198/781.02 |
| 4,746,320 A | * | 5/1988 | Kilwin | 464/36 |
| 5,575,316 A | * | 11/1996 | Pollklas | 141/198 |
| 5,581,985 A | * | 12/1996 | Secosky | 56/10.3 |
| 5,733,196 A | * | 3/1998 | Nienhaus | 464/1 |

FOREIGN PATENT DOCUMENTS

| DE | 31 51 486 C | 4/1983 |
|---|---|---|
| DE | 34 18 558 C | 6/1985 |
| DE | 41 37 829 A | 5/1993 |
| DE | 195 38 351 C | 5/1997 |
| DE | 196 11 622 C | 7/1997 |
| DE | 197 15 269 C | 11/1998 |
| DE | 197 44 154 C | 4/1999 |
| EP | 0 492 195 | 12/1991 |
| EP | 0 672 339 A | 9/1995 |
| EP | 1 092 342 | 4/2001 |
| EP | 1 151 653 | 4/2001 |
| FR | 2 224 070 | 10/1974 |
| FR | 2 622 945 | 5/1989 |

* cited by examiner

*Primary Examiner*—Árpád Fábián Kovács
*Assistant Examiner*—Alicia Torres

(57) ABSTRACT

A drive arrangement for selectively repositioning a discharge spout of an agricultural harvesting machine by rotating it about a substantially vertical axis includes a drive motor coupled to a driveline incorporating a slip clutch operable for interrupting power flow to the spout in response to the driving torque exceeding a predetermined threshold value so as to prevent damage to the spout and/or drive motor when the spout impacts or is driven against an obstacle. The overload clutch is constructed so as to resist spout movement after the clutch has interrupted the flow of power through the driveline and to automatically reestablish power flow once the cause for the overload no longer exists.

4 Claims, 2 Drawing Sheets

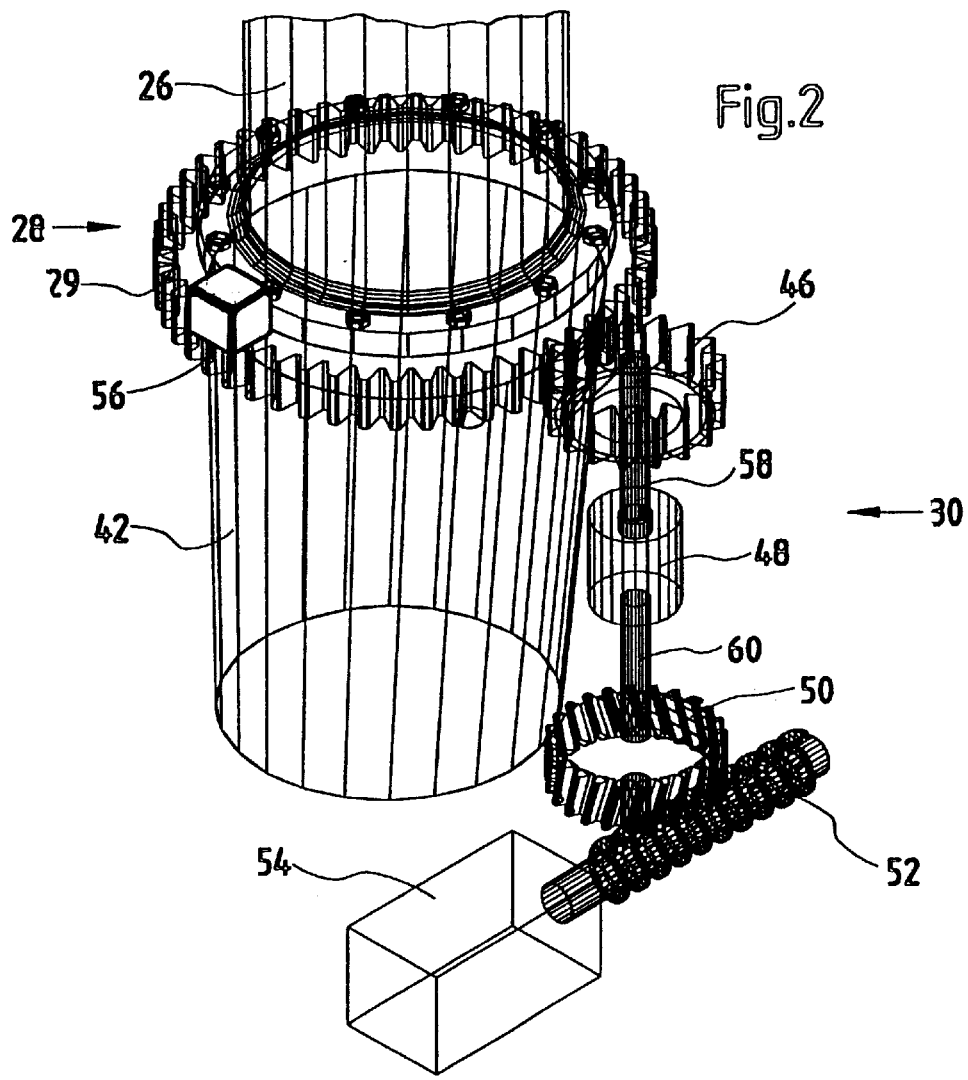
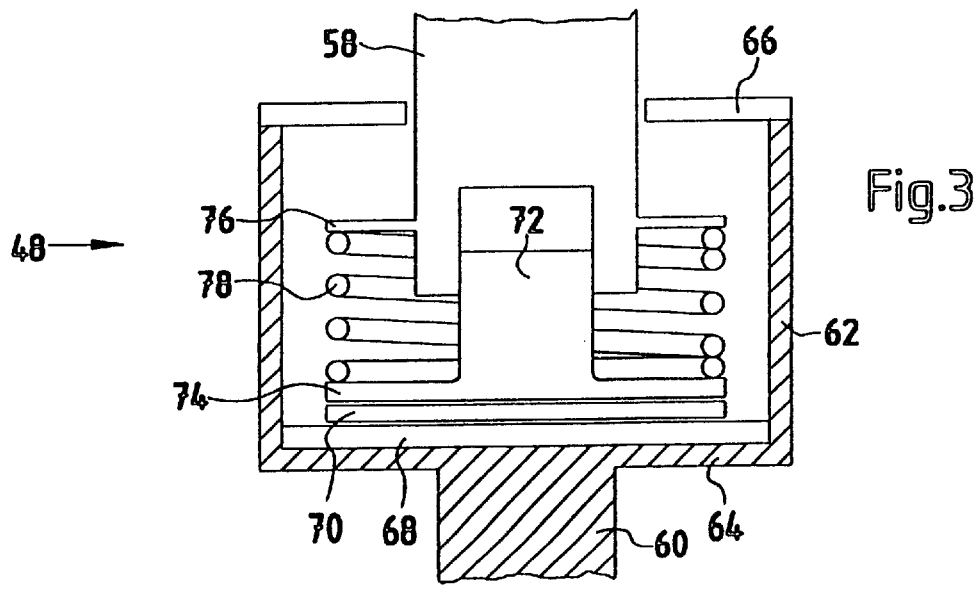

DRIVE ARRANGEMENT FOR ENSILAGE HARVESTER DISCHARGE SPOUT

FIELD OF THE INVENTION

The invention concerns an arrangement for driving a discharge spout of an agricultural harvesting machine, and more specifically, concerns a drive including a motor, that is connected with the discharge spout over a driveline, and is arranged to pivot the spout about an approximately vertical axis, where an overload clutch is inserted into the driveline that interrupts the driveline when a threshold value of the torque transmitted to the discharge spout is exceeded.

BACKGROUND OF THE INVENTION

In harvesting machines with discharge spouts that can be rotated about a vertical axis, such as combines with ejection ducts and forage harvesters with curved ejection ducts, there is the danger that the discharge spout can be damaged if it is thrown against an obstacle, such as a tree standing at the edge of the field, a power line pole or a transport vehicle operating alongside.

EP 0 492 195 A proposes that the drive arrangement including a worm gear meshed with a turning circle of a curved discharge duct of a forage harvester will automatically disengage when excessive torques are applied to the discharge duct. Thereby the curved discharge duct can rotate freely and avoid an obstacle. The worm gear is blocked in the disengaged position by a blocking pawl. Therefore an operator must again release the blocking pawl after the trouble has been removed. The operator must therefore climb out of the operator's cab in order to release the blocking pawl at a location that is difficult to access and can continue the operation only after that. The free rotation of the curved discharge duct after the worm gear has been disengaged also has its problems, because after a first impact with an obstacle it can then recoil and collide with another obstacle and be damaged thereby.

EP 0 672 339 A proposes that a shear pin be inserted into the driveline of the curved discharge duct of a forage harvester which shears upon unusual loading of the curved discharge duct. After the end of the unusual overload the shear pin must be replaced since it is usually located in a relatively inaccessible location this is possible only with a considerable time delay. If no shear pin is available the forage harvester cannot be used for an extended period of time. Furthermore the aforementioned disadvantages of the ability to rotate freely still remains.

EP 1 092 342 A discloses a forage harvester whose curved discharge duct can be moved by a hydraulic motor. A pressure relief valve and feeder valve are arranged between the supply line and/or the return line of the hydraulic motor and the oil leakage line. The result is that in the case of a collision the hydraulic motor acts as a pump and brakes the curved discharge duct with a specified force. If it is driven for repositioning of the curved discharge duct just at the point of impact, the oil pressure that drives it is bled off by the pressure relief valve. The disadvantage here is that the hydraulic motor provides a relatively high braking effect on the basis of the gear ratio of the intervening gearbox, so that damage to the curved discharge duct remains conceivable. This solution is also relatively expensive and costly due to the necessary hydraulic elements.

The problem underlying the invention is seen in the need to define an arrangement that is not too costly for the drive of a discharge spout that avoids damage to the discharge spout in the case of an impact of the discharge spout with an obstacle and that is distinguished by operator friendliness.

SUMMARY OF THE INVENTION

According to the present invention, there is provided an improved drive for repositioning the discharge duct or spout of an agricultural harvester.

An object of the invention is to provide a drive arrangement for a discharge spout which includes an overload clutch that automatically reestablishes the driving connection between the drive motor and the discharge spout as soon as the excessive torque acting upon the discharge spout is reduced. In normal operation the overload clutch transmits the driving torque from the drive motor to the discharge spout. Thus, the overload clutch separates the driveline, that connects the drive motor with the discharge spout so as to transmit normal torque, in the event the torque to be transmitted exceeds a threshold value, as may be caused by the discharge spout striking an obstacle during the operation, resulting in the discharge spout transmitting a torque to the drive motor, or as may be caused by the drive motor forcing the discharge spout against a fixed obstacle resulting in an applied load exceeding the normal torque. When the discharge spout no longer interacts with the obstacle the overload clutch again engages automatically, so that normal operation is again possible. Appropriate overload clutches are, for example, cam controlled clutches and star ratchets.

In this way damage to the discharge spout is avoided by simple means and after an impact with an obstacle normal operation is again immediately possible.

Yet another object of the invention is to provide a drive for a discharge spout that includes a clutch that is operable for providing a braking force that acts to prevent the discharge spout from swinging freely after an impact with an obstacle. An example of an overload clutch which is operable to provide a braking torque after it has interrupted the driveline is a friction clutch.

BRIEF DESCRIPTION OF THE DRAWINGS

FIG. 2 is a schematic view showing a drive coupled for rotating the discharge spout of the harvesting machine of FIG. 1.

FIG. 3 shows a cross section of the overload clutch illustrated in FIG. 2.

DESCRIPTION OF THE PREFERRED EMBODIMENT

Figure 1:
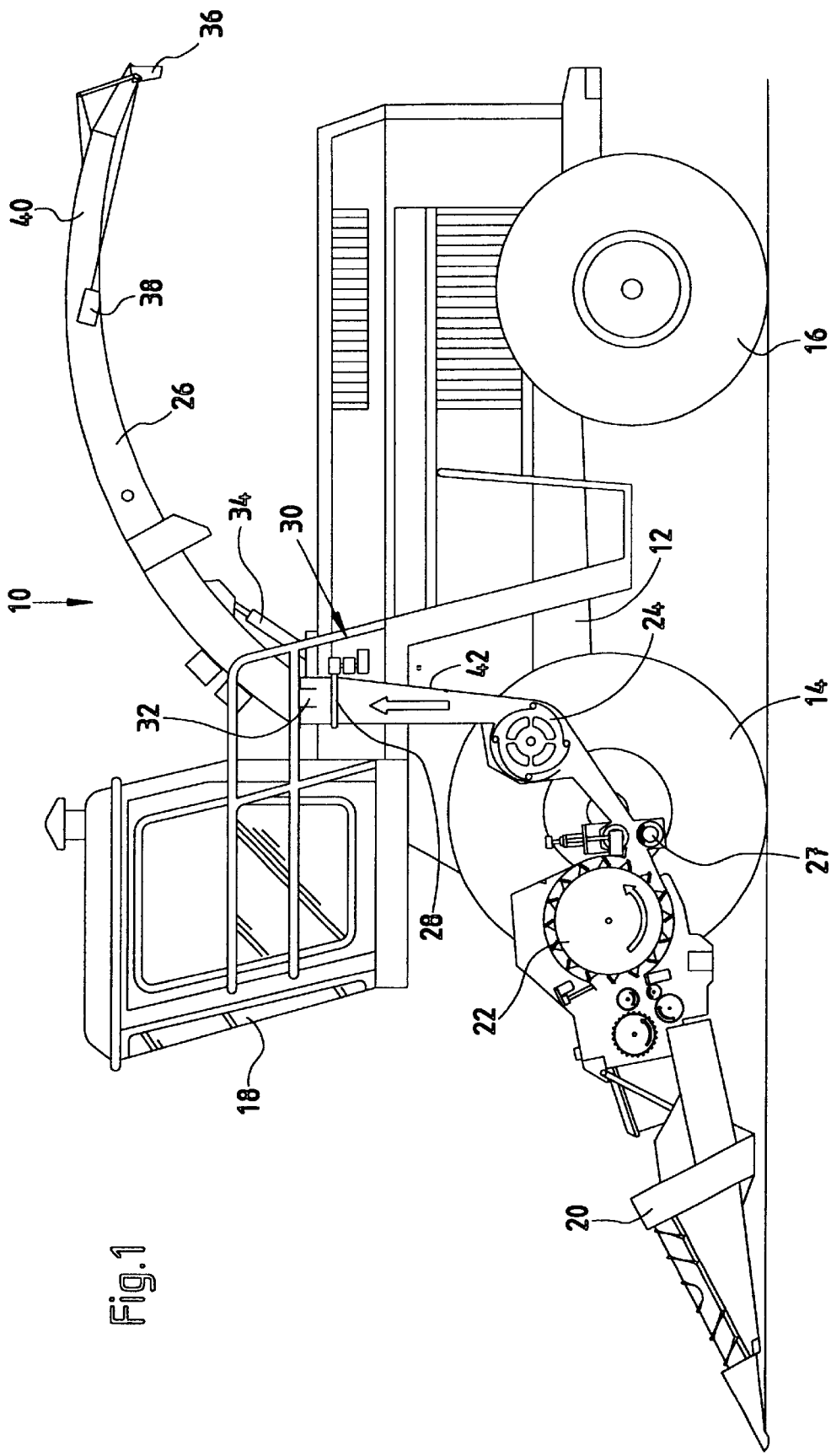
FIG. 1 is a schematic left side elevational view of a harvesting machine, which is an exemplar of a machine with which the present invention is particularly adapted for use.

Referring now to FIG. 1, there is shown a harvesting machine 10 in the form of a self-propelled forage harvester including a main frame 12 that is carried on front and rear wheels 14 and 16. The operation of the harvesting machine 10 is controlled from an operator's cab 18 from which a crop recovery arrangement 20 can be viewed. Crop taken up from the ground by means of the crop recovery arrangement 20, for example, corn, grass or the like is conducted to a chopper drum 22 that chops it into small pieces and delivers it to a conveyor arrangement 24. The conveyor arrangement 24 conveys the crop in a rigid ejection tower 42, that extends approximately vertically, that is followed by a discharge spout 26 that can be rotated relative to the ejection tower 42 about an approximately vertical axis and is in the form of a curved ejection duct. The crop leaves the harvesting machine 10 over the discharge spout 26 and is thrown to a container of a transport vehicle operating alongside. Between the chopper drum 22 and the conveyor arrangement 24 a post-chopper reduction arrangement 27 extends, that can be selectively inserted and removed from the flow of the crop, by means of which the crop to be conveyed is conducted tangentially to the conveyor arrangement 24.

The position of the discharge spout 26 can be changed by three actuators 30, 34 and 38. A first actuator or drive arrangement 30, described in greater detail below, is used for the rotation of the discharge spout 26, that is supported in bearings, free to rotate, about a vertical axis on a turning circle 28. The actuator 30 thereby makes it possible to rotate the discharge spout 26 to the rear into the transport position shown in FIG. 1, or to rotate it to the left or the right alongside the harvesting machine 10. A second actuator 34 in the form of a hydraulic cylinder is arranged to pivot the discharge spout 26 about a horizontal axis 32 located at its upstream end. Thereby the second actuator 34 defines the height of the downstream end of the discharge spout 26. A third actuator 38 in the form of a hydraulic cylinder is used to pivot an ejection door 36 at the downstream end 40 of the discharge spout 26. The ejection door 36 can be adjusted so as to make it possible to control the angle at which the harvested crop leaves the discharge spout 26. The actuators 34 and 38 are single acting or double acting hydraulic cylinders, where in the case of single acting hydraulic cylinders the weight of the discharge spout 26 itself or the ejection door 36 itself make possible the return movement.

FIG. 2 shows the turning circle 28 and the actuator or drive arrangement 30, which is provided for the rotation of the discharge spout 26 about the vertical axis, in greater detail. In the interior of the turning circle 28, the underside of the discharge spout 26 is supported relative to the ejection tower 42 in rolling contact bearings, free to rotate (but not shown for the sake of clarity). At the outer circumference of the turning circle 28, a first, ring-shaped gear 29 is arranged that is locked to transmit torque to the discharge spout 26. The gear teeth of the first gear 29 mesh with a second gear 46, that is connected for receiving torque transmitted to it by a first, vertical shaft 58. The first shaft 58 is connected so as to be driven by an overload clutch 48 which is connected over a second shaft 60, that is also vertical, to a third gear 50 so as to transmit driving torque to the clutch 48. The third gear 50 meshes with a worm gear drive 52, that rotates about a horizontal axis which is coupled to a drive motor 54 in the form of a hydraulic motor. The shafts 58 and 60 as well as the worm drive gear 52 are supported in bearings, not shown, directly or indirectly on the frame 12 of the harvesting machine 10. The drive motor 54 is also connected directly or indirectly to the frame 12 of the harvesting machine 10.

Thereby the drive motor 54 is arranged to pivot the discharge spout 26 about the vertical axis over a driveline consisting of the worm gear drive gear 52, the third gear 50, the second shaft 60, the overload clutch 48, the first shaft 58, the second gear 46 and the first gear 29. The drive motor 54 is controlled by an operator in the operator's cab 18.

A sensor 56 is provided that can determine the angle of rotation of the discharge spout 26 by any desired means in order to display to an operator in the operator's cab 18 information about the immediate angle of rotation of the discharge spout 26 or in order to use this information for the control of the control arrangement that is arranged to bring the discharge spout 26 into a desired position by control of the drive motor 54, which position can be provided as input by the operator or otherwise automatically controlled. The sensor 56 may, for example, be an incremental angle transmitter that operates optically and interacts with corresponding markings on the discharge spout 26. It can also operate on an inductive basis and interact with permanent magnets attached to the discharge spout 26.

The overload clutch 48 is configured in such a way that it disengages when a defined torque transmitted by the second shaft 60 to the first shaft 58 (or the reverse) is exceeded, that is, it interrupts the transmission of torque between the first shaft 58 and the second shaft 60. In this way the discharge spout 26—otherwise not supported on the frame 12—becomes able to rotate about the vertical axis in the case of an overload and can avoid being damaged by coming into contact with obstacles. The result is that the discharge spout 26 is not damaged, if the drive motor 54 forces the discharge spout 26 against an obstacle, for example, the transport vehicle operating alongside the harvesting machine for the chopped crop, or if the discharge spout 26 collides with an obstacle during the operation. Furthermore, in such cases, any damage to the drive motor 54 and the other mechanical elements of the actuator 30 need not be feared.

The overload clutch 48, according to the invention, interrupts the driving connection, as soon as the difference of the torques between the first and second shafts 58 and 60, respectively, exceeds a defined threshold. When the threshold value is no longer exceeded, the driving connection is automatically re-established. For the overload clutch 48, a device known in itself, such as a star ratchet, a friction clutch or a cam controlled clutch can be employed. Overload clutches of this type are commercially available from the firm GKN Walterscheid, 53797 Lohmar, Del. under the designations K32B, K94B or K64/1. Appropriate overload clutches are also disclosed in the publications DE 31 51 486 C, DE 34 18 558 C, DE 41 37 829 A, DE 195 38 351 C, DE 196 11 622 C, DE 197 15 269 C and DE 197 44 154 C, whose disclosures are incorporated into the present application by reference.

A possible embodiment of an overload clutch 48 is shown in FIG. 3. The overload clutch 48 includes a cylindrical housing 62 having a bottom 64 and a cover 66. The bottom 64 is connected with the second shaft 60 and oriented coaxially to it. The cover 66 is screwed onto the housing 62 and contains a central opening through which the first shaft 58 extends. A first friction lining 68 is fastened to the bottom 64. A second friction lining 70 is located on the first friction lining 68 and is connected with a carrier 74 on its surface opposite the first friction lining 68. The carrier 74 is connected with a stub shaft 72, that is arranged coaxially to the first shaft 58. The stub shaft 72 and the lower end of the first shaft 58 engage each other and can slide relative to each other in the vertical direction, but are coupled to each other so as to transmit torque, since their cross sections are non-circular. The inner cross section of the lower end of the first shaft 58 and the outer cross section of the stub shaft 72 may, for example, be square. The first shaft 58 carries a ring 76 on which a helical spring 78 is supported, which forces the carrier 74 downward and thereby forces the second friction lining 70 against the first friction lining 68. Obviously it would be conceivable to subdivide the first shaft 58 into two partial parts that can be separated from each other of which only one extends into the housing 62. Thereby the assembly and the replacement of the overload clutch 48 would be simplified. The second shaft 60 could also be separable from the overload clutch 48.

The torque from the second shaft 60 is transmitted over the bottom 64 to the first friction lining 68. From there it is transmitted to the second friction lining 70 and over the carrier 74 and the stub shaft 72 to the first shaft 58. If the torque transmitted exceeds a threshold value, that is a function of the material and the dimensions of the friction linings 68 and 70 and the force of the helical spring 78, the friction linings 68 and 70 begin to rotate relative to each other. The driving connection is interrupted. In the case of an impact of the discharge spout 26 against an obstacle, the spout 26 can therefore avoid being damaged by the impact. If the discharge spout 26 is blocked mechanically by an obstacle, it can then not be damaged when the drive motor 54 is in operation because of the interrupted driving connection. Simultaneously, the friction linings 68 and 70 rubbing against each other generate a braking torque that prevents a free rotation of the discharge spout 26 and possible impact with a second obstacle. As soon as the torque transmitted no longer exceeds the threshold value, the driving connection is reestablished. The operator in the operator's cab 18 or the control arrangement described above can thereby rotate the discharge spout 26 again by operation of the drive motor 54, as soon as the discharge spout 26 is no longer blocked.

Having described the preferred embodiment, it will become apparent that various modifications can be made without departing from the scope of the invention as defined in the accompanying claims.

What is claimed is:

1. In a combination including a discharge spout of a harvesting machine mounted for rotation about a substantially vertical axis, and a drive arrangement including a drive motor connected to said discharge spout over a driveline for selectively effecting said rotation, with said drive line including a drive gear carried by said drive motor, a driven gear fixed to said discharge spout and an overload clutch that interrupts said drive line in response to a torque exceeding a threshold value being transmitted to said discharge spout, the improvement comprising: said driveline including a first pear fixed to a first shaft and meshed with said drive gear; a second gear fixed to a second shaft and meshed with said driven gear; and said overload clutch including structure connected between said first and second shafts for automatically reestablishing the drive connection through said driveline when the torque is reduced below said threshold value.

2. The combination, as defined in claim 1, wherein said overload clutch includes clutching components that effect a braking torque for the discharge spout when the torque applied to the discharge spout exceeds said threshold value.

3. The combination, as defined in claim 2, wherein said overload clutch is a friction clutch with said clutching components being discs.

4. The combination, as defined in claim 3, wherein said overload clutch includes a spring cup fixed to said first shaft and a spring abutment fixed to said second shaft; a spring carrier located within said cup and being mounted to said second shaft for axial movement toward and away from a bottom of said cup and for rotation with said second shaft; a coil compression spring being received between said spring abutment and said spring carrier and biasing said carrier toward said bottom of said cup; and said clutching components being a first friction disc fixed to said spring carrier and a second friction disc fixed in said bottom of said cup.

* * * * *